United States Patent
DuFaux (10) Patent No.: US 6,798,401 B2
(45) Date of Patent: *Sep. 28, 2004

(54) OPTICAL SYSTEM FOR INPUTTING POINTER AND CHARACTER DATA INTO ELECTRONIC EQUIPMENT

(75) Inventor: Douglas Paul DuFaux, Houston, TX (US)

(73) Assignee: Tree Frog Technologies, LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/430,820

(22) Filed: May 6, 2003

(65) Prior Publication Data

US 2003/0193479 A1 Oct. 16, 2003

Related U.S. Application Data

(63) Continuation of application No. 09/572,349, filed on May 17, 2000.

(51) Int. Cl.$^7$ ................................................ G09G 5/00
(52) U.S. Cl. ........................................ 345/168; 345/170
(58) Field of Search ................................ 345/156, 168, 345/173, 174, 169, 175, 170, 172; 341/20–21, 22, 31; 400/472, 479; 250/227.22, 221, 224; 178/18.01, 18.09, 49.05

(56) References Cited

U.S. PATENT DOCUMENTS

| | | | | |
|---|---|---|---|---|
| 4,177,354 A | * | 12/1979 | Mathews | 178/19.05 |
| 4,713,535 A | * | 12/1987 | Rhoades | 250/221 |
| 4,980,685 A | * | 12/1990 | Souloumiac et al. | 341/31 |
| 5,450,148 A | * | 9/1995 | Shu et al. | 353/42 |
| 5,457,454 A | * | 10/1995 | Sugano | 341/22 |
| 5,581,484 A | * | 12/1996 | Prince | 702/150 |
| 5,718,496 A | * | 2/1998 | Feldman et al. | 353/42 |
| 5,757,361 A | * | 5/1998 | Hirshik | 345/156 |
| 5,785,439 A | * | 7/1998 | Bowen | 400/472 |
| 5,815,126 A | * | 9/1998 | Fan et al. | 345/8 |
| 5,909,210 A | * | 6/1999 | Knox et al. | 345/168 |
| 5,938,308 A | * | 8/1999 | Feldman et al. | 353/42 |
| 5,977,935 A | * | 11/1999 | Yasukawa et al. | 345/8 |
| 6,002,390 A | * | 12/1999 | Masui | 345/173 |
| 6,022,126 A | * | 2/2000 | Sekine et al. | 362/259 |
| 6,037,882 A | * | 3/2000 | Levy | 341/20 |
| 6,097,374 A | * | 8/2000 | Howard | 345/168 |
| 6,167,469 A | * | 12/2000 | Safai et al. | 710/62 |
| 6,218,967 B1 | * | 4/2001 | Maula | 341/31 |
| 6,266,048 B1 | * | 7/2001 | Carau, Sr. | 345/168 |
| 6,281,878 B1 | * | 8/2001 | Montellese | 345/156 |
| 6,611,252 B1 | * | 8/2003 | DuFaux | 345/168 |
| 6,614,422 B1 | * | 9/2003 | Rafii et al. | 345/168 |

OTHER PUBLICATIONS

Vertual Keyboard (1990).*

* cited by examiner

Primary Examiner—Chanh Nguyen (57) ABSTRACT

A virtual data input device to optically interface with an operator to detect the position of objects within an input zone, i.e., an area defined as a "virtual keyboard" in which the operator may interact to enter character or other data into computing equipment. The input device includes a source of optical sensor light illuminating the input zone that reflects off the objects in a direction generally toward the input device. The device also includes an optical detector arranged to receive reflected sensor light as a light pattern, representing the position of the objects within the input zone, and converts the reflected light pattern to an electrical signal. A microprocessor then receives the electrical signal and correlates the electrical signal to character or other data. An image generator may be used to project an optical image that represents, for example, an image of a keyboard.

3 Claims, 9 Drawing Sheets

OPTICAL SYSTEM FOR INPUTTING POINTER AND CHARACTER DATA INTO ELECTRONIC EQUIPMENT

CROSS-REFERENCE TO RELATED APPLICATIONS

This is a continuation of application Ser. No. 09/572,349, filed on May 17, 2000.

FIELD OF THE INVENTION

The present invention relates generally to data input devices and, more particularly, to data input devices adapted for use with portable communications and computing equipment.

BACKGROUND OF THE INVENTION

Demand for compact communications and computing equipment has increased dramatically over the last decade. Computers that can be held in the palm of your hand and wireless phones that fit in a shirt pocket are two examples of popular miniaturized machines. More recently, demand for wireless e-mail and Internet access has begun to soar, with experts projecting future demand to rise at unprecedented rates.

One problem associated with miniaturized communications and computing equipment is having a convenient way to input data, such as character and pointing device data, into such equipment. Early miniaturized computing equipment, typical of the 1990s, included a miniaturized keyboard that was scaled to fit the desired sized of the computing equipment. Typing a few words using such systems is quite laborious because the operator's fingers are typically too large to use the device as a traditional keyboard. Portable communication equipment, on the other hand, typically include a conventional 12-button keypad to input data. It is extremely difficult to use this set-up to enter non-numerical data. For example, to enter the word CALL, an operator would hit the button marked "2-A-B-C" three times for C, the button marked "2-A-B-C" once for A, the button marked "5-J-K-L" three times for L, and finally the button marked "5-J-K-L" three times again for the final L.

To ease the problem of character input, some manufacturers of both communications and computing equipment have recently developed pen-type portable devices in which a real keyboard or keypad is not provided and data input operations can be carried out by utilizing a miniaturized virtual keyboard displayed on a touch sensitive screen. The pen can also be used as a pointing device to select items on the screen. An additional feature of many touch sensitive screen systems is the ability to write characters with a pen or stylus that is recognized as individual characters by the device. Another recent development is the collapsible keyboard, such as those currently being marketed by Palm Computing. This keyboard may be folded and carried in a briefcase or even a pocket, and is opened and plugged into the miniaturized equipment before it is ready to use. Yet another development is voice recognition. However, this technology is not currently highly reliable and, as a result, input errors are common. Furthermore, numerous circumstances arise where voice input is not practical or appropriate. Moreover, voice recognition is not suitable for entering pointing device information.

While each of these methods represents a form of improvement over previous technologies, the need remains for a data input device for use with miniaturized communications and computing equipment that allows an operator to easily input characters and data into such equipment. Preferably, such an input device would incorporate wireless techniques to sense the position and motion of the operator's fingers to allow the user to enter data without the use of a physical keyboard or a pointing device.

SUMMARY OF THE INVENTION

A data input device having these desired features has now been developed. Broadly speaking, the data input device of the present invention optically interfaces with an operator to detect the position of objects within a particular input zone, e.g., an area defined as a "virtual keyboard" in which the operator may interact to enter character data into associated computing equipment. Preferably, the objects are the operator's fingers placed within the input zone. As a character input device, each character data corresponds to a unique arrangement and position of the objects within the input zone. As a pointing device, the relative motion of the operator's fingers defines the input area. The input device includes a source of optical sensor light illuminating the input zone with sensor light. The source of optical sensor light may be ambient light surrounding the operator or a light emitting device adapted to emit light in a direction toward the operator's fingers. Preferably, the source of optical light covers the input zone. The sensor light reflects off the objects in a direction generally toward the input device. The data input device also includes an optical detector arranged to receive the reflected sensor light as a reflected light pattern representing the relative position of the operator's fingers within the input zone. The optical detector converts the reflected light pattern to an electrical signal representing the particular character data desired to be entered by the operator. A microprocessor then receives the electrical signal and correlates the electrical signal to character or position/motion data.

In one embodiment of the virtual data input device, an image generator is used to project an optical image that represents character data, e.g., an image of a real keyboard. The image generator may be formed by an optical element, such as a stencil, mask, holographic element, mirror array, or other suitable device known in the art of image projection, designed to allow light to pass through portions of the optical element and a light generator positioned to emit visible light through the portions of the optical element, whereby the light passed through the optical element forms the optical image.

The present invention also includes a novel method to enter character data into communications or computing equipment based on the position of objects within an input zone, e.g., an operator's fingers on a virtual keyboard. The position of the objects within the input zone uniquely corresponds to particular character data. A reference position is established to associate an initial position of the objects within the input zone and to associate a plurality of positions of the objects within the input zone to unique character data. A source of optical sensor light is provided to illuminate the input zone such that the sensor light reflects off the objects. The reflected sensor light is then received as a reflected light pattern representing the position of the objects within the input zone. The reflected light pattern is converted to an electrical signal that is then correlated to the unique selection of character data, which may then be input into the electronic equipment.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 1:
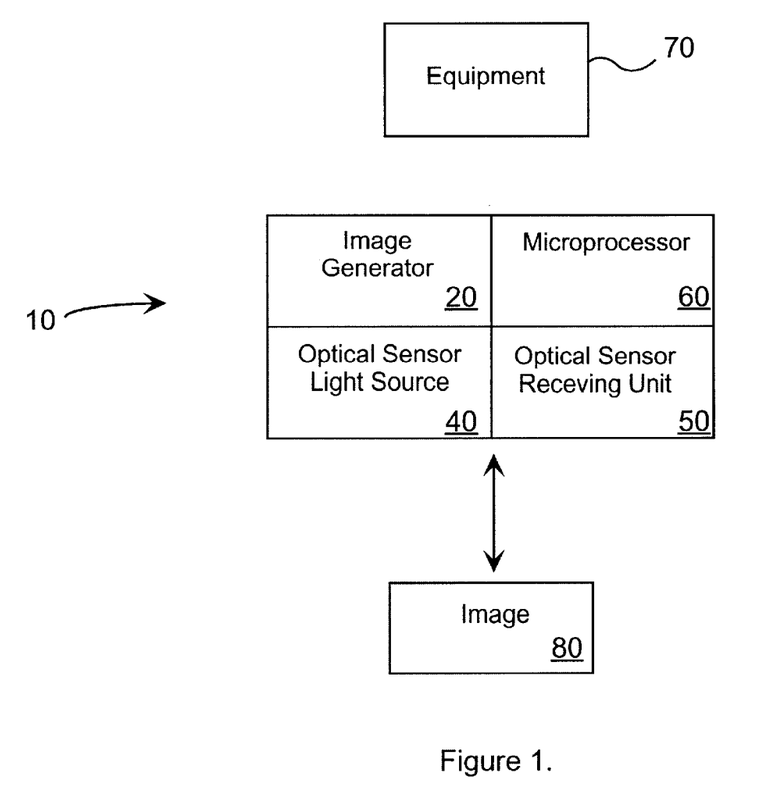
FIG. 1 is a diagrammatic representation of a data input device in accordance with a preferred embodiment of the present invention.

FIG. 1 illustrates a preferred embodiment of the virtual data input device 10 of the present invention. The virtual data input device 10 may incorporate four primary elements including an image generator 20, an optical sensor light source 40, an optical sensor receiving unit 50, and a microprocessor 60, which controls overall system operation. The virtual data input device 10 optically interfaces with an operator desiring to enter characters, position, or other forms of data into equipment 70 such as any form of communications or computing equipment. This data may include any character or function typically incorporated into a conventional keyboard, including alphanumerics, symbols, function keys, operational keys (e.g., Tab and Enter) and Hot Keys. The characters and the like used by the operator to input this data may be displayed on a virtual keyboard 80, which may take one of many forms as described below. While the virtual data input device 10 of the present invention is particularly adapted for use with portable communications and computing equipment, including, for example, cellular telephones, Internet-ready cellular telephones, personal digital assistants, and the like, the virtual data input device 10 may also be suited for use with virtually any form of communications or computing equipment requiring entry of characters, pointing device data, and/or other forms of data, including standard desktop computers. Of course, the equipment 70 may include and/or interface with other forms of input and output devices, including display monitors, conventional keyboards, a pointing device (e.g., a mouse device), tablets, disk drives, infrared devices, and the like. The virtual data input device 10 is adapted to discriminate the position and motion of objects, e.g., the operator's fingers, and to generate character and position/motion information from such position and motion, all as described herein.

Figure 2:
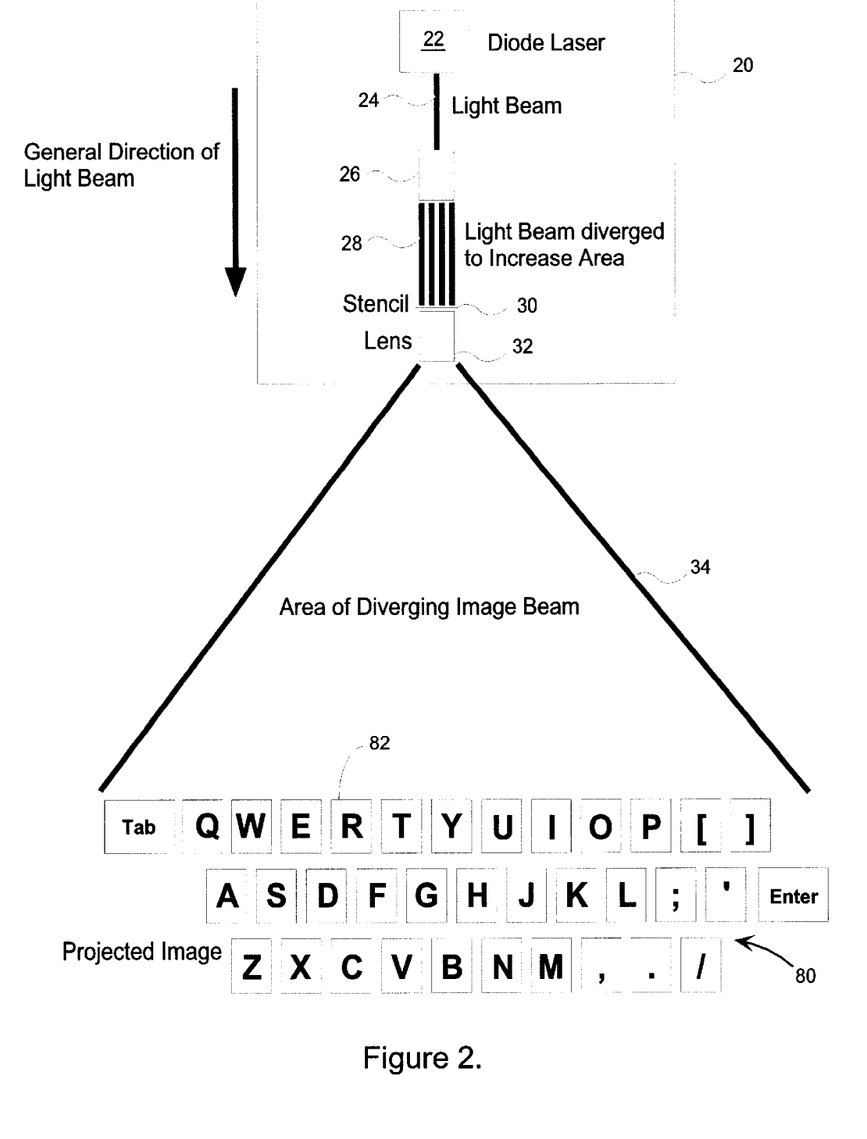
FIG. 2 is a diagram illustrating the principal components of a keyboard image generator used in the present invention.

FIG. 2 illustrates an image generator 20 in accordance with one embodiment of the present invention. The image generator 20 is designed to project an optical image of an input device, for example, a conventional QWERTY keyboard, onto any surface available to the operator, such as a table top, a desktop, a laptop, the ground, or a piece of paper. The image generator 20 includes a light generator 22, an optical deflection device 30, such as a stencil, and various lenses. The light generator 22 may be a diode laser, a gas laser, or other type of laser, a traditional incandescent light bulb or a florescent light bulb, a light emitting diode (LED), or other suitable device capable of producing visible light. Preferably, the light generator 22 is low power and compact in design so that it may be incorporated into small communications and computing equipment such as cellular telephones and hand-held personal digital assistants.

The light generator 22 delivers a visible light beam 24 to a collimating lens 26. The collimating lens 26 diverges the light beam 24 and emits collimated rays 28 of light having an increased cross-sectional area. Rays 28 are then projected through a deflective optical element 30 and through lens 32. Lens 32 expands the rays 28 to project an image, such as of a full size keyboard, at a suitable distance from the input device 10 and preferably adjacent an operator. Alternatively, the image generator 20 may be designed to project light through the deflective optical element 30 at a particular distance without the use of lens 32. A diverging image beam 34 is produced that projects an image, such as an image 80 of a conventional keyboard, onto any surface. The image 80 is typically formed from a plurality of discrete sub-images 82, that may represent, for example, particular keys on a conventional keyboard. The image 80 generally defines an input zone, i.e., the two-dimensional area within which the virtual data input device 10 will detect the position of the operator's fingers and correlate such position to unique character data. Each of the discrete sub-images 82 may then be selected by the operator for input into the equipment 70 based upon a unique position of objects within the input zone, e.g., a particular arrangement of fingers on the "virtual keyboard."

The light generator 22 may include features to control the brightness, contrast and focal length of image 80. In addition, collimating lens 26 and/or lens 32 may be adjustable to allow the operator to control the position and focus of the projected image 80.

Figure 3:
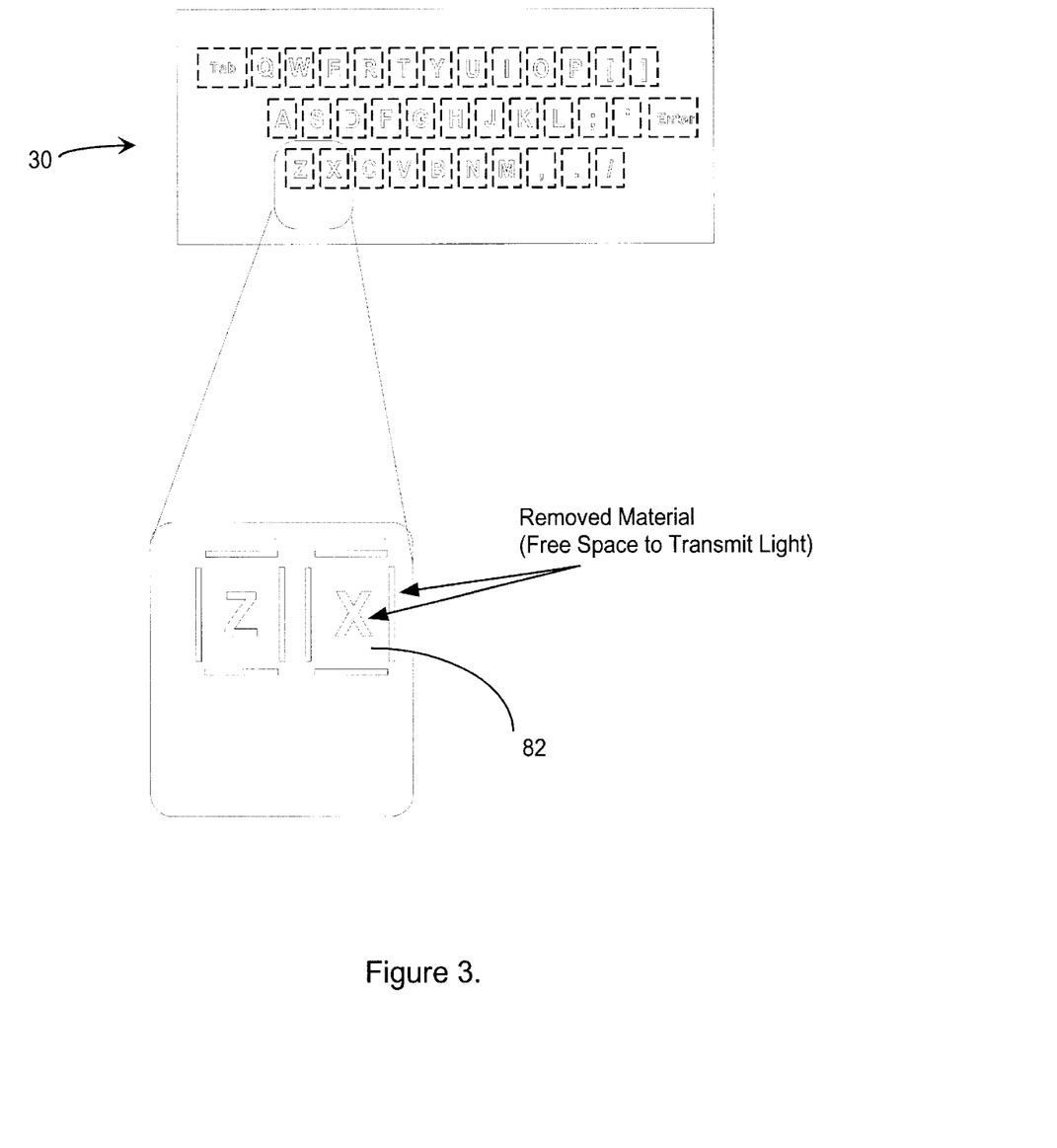
FIG. 3 is a diagram illustrating a stencil used to form an image of a keyboard.

FIG. 3 illustrates a deflective optical element 30 in the form of a stencil that may be used to form an image of a keyboard. The deflective optical element 30 may also be formed by a mask, holographic element, mirror array, or other suitable device known in the art of image projection. The art of manufacturing deflective optical elements is well known in the image projection industry and, more particularly, the art of making stencils and masks is also well known in the semiconductor and electronics industry. As is known, features on the order of tenths of a micron can easily be formed on deflective optical elements, thus permitting the deflective optical element 30 to be installed into small components. The deflective optical element 30 may be formed from an opaque material having portions of the material representing the keyboard or other image removed to allow light therethrough. While the deflective optical element 30 depicted in FIG. 3 shows a simple QWERTY keyboard, those skilled in the art will recognize that the deflective optical element 30 could be adapted to allow the projection of virtually any form of image. The image projected by the image generator 20 is used to both align the operator with the virtual data input device 10 and to define the potential character data.

Figure 4:
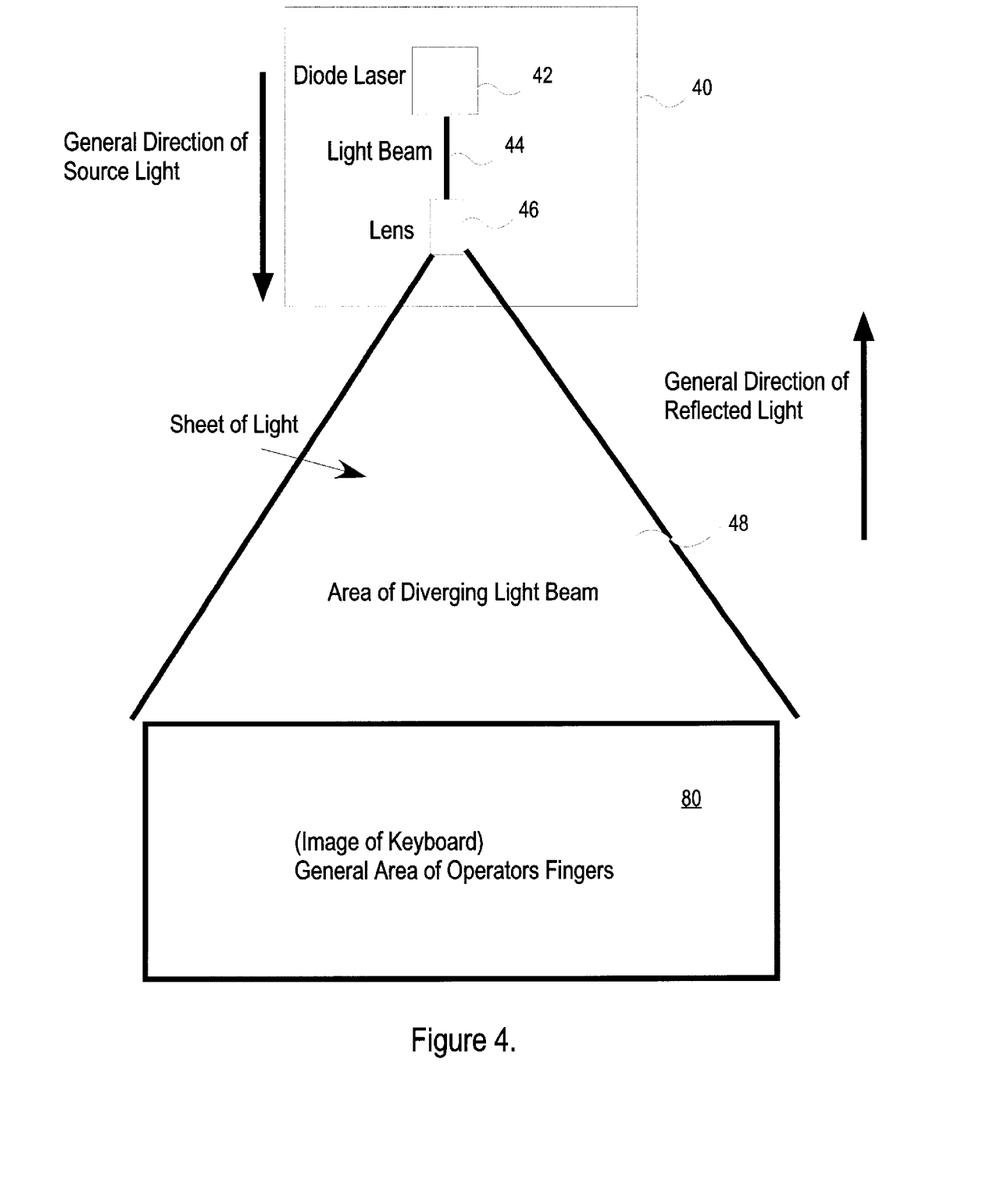
FIG. 4 is a diagram illustrating the principal components and operation of an optical sensor light source used in the present invention.

FIG. 4 illustrates the components of one embodiment used in and the operation of the optical sensor light source 40. The light source 40 is used in conjunction with the optical sensor receiving unit 50 to sense and discriminate the position and motion of the operator's fingers and to generate a signal representing data (i.e., alphanumeric characters) information from such position and motion information. The light source 40 includes a fight emitting device 42, for example, a diode laser producing a light beam 44 that is projected through a lens 46 to form a sheet of light 48 that is directed outwardly and in the general direction of the operator's fingers. Preferably, the light emitting device 42 produces light having a different wavelength than the light produced by the light generator 22 of the image generator 20, and generates non-visible light to prevent interference with the image of the keyboard projected by the image generator 20 and to prevent the operator from being distracted. The light source 40 is preferably arranged to cover the entire input zone (i.e., the projected image 80).

Figure 5:
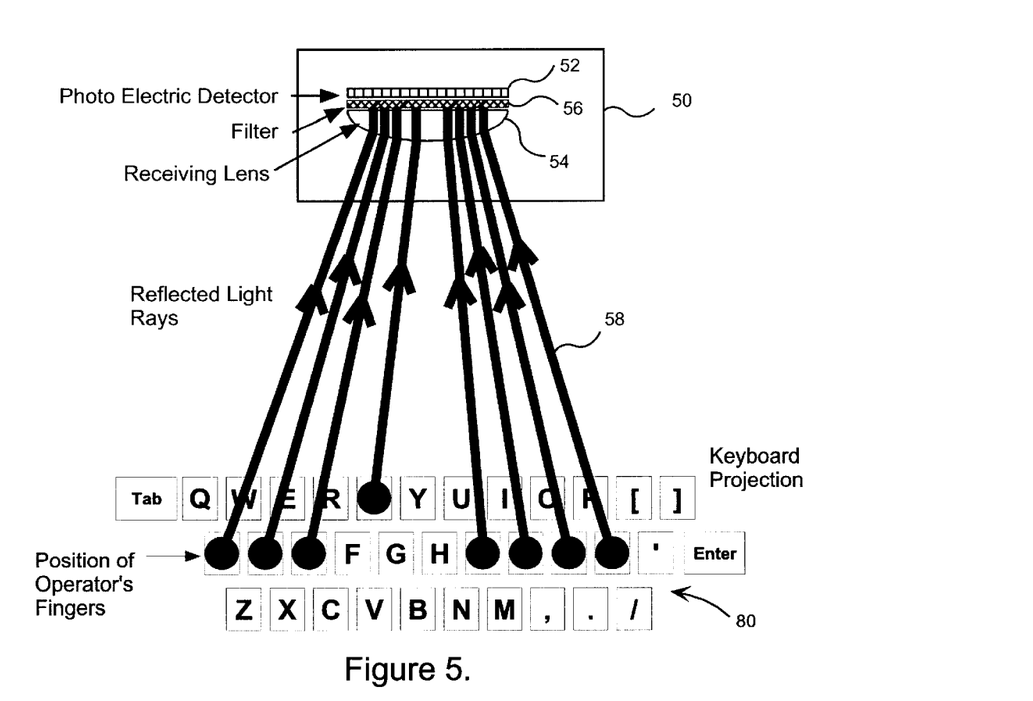
FIG. 5 is a diagram illustrating the principal components and operation of optical sensor receiving unit used in the present invention.
Figure 6:
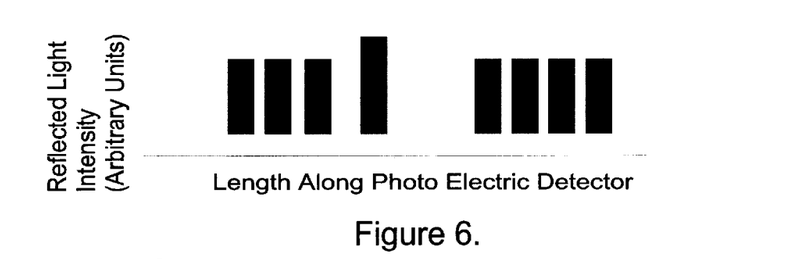
FIG. 6 is an illustration of a reflected light pattern received by the optical sensor receiving unit of FIG. 5.
Figure 7:
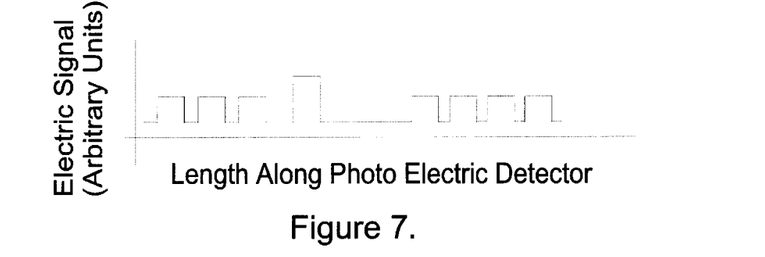
FIG. 7 is an illustration of an electrical signal generated from the light pattern of FIG. 6.

As shown in FIG. 5, the sheet of light 48 generated from the light source 40 reflects off the operator's finger(s) as reflected light rays 58. These light rays 58 are received by a light sensing device 52, such as a single or an array of photoelectric detector(s), possibly with the aid of a collecting lens 54. The use of a collecting lens 54 may be necessary to form parallel beams of light that are projected onto the light sensing device 52. One example of a commercially available light sensing device 52 suitable for use is a single or multiple bar code scanning device. The light pattern received by the sensing device 52 is illustrated in FIG. 6. The reflected light pattern represents the position of the operator's fingers within the input zone. The position and intensity of each reflected light ray 58 along the length of the light sensing device 52 represents the position of the "key" in the virtual image 80 that is depressed by the operator. The intensity (strength) of the signal received by the light sensing device 52 represents the distance from the point of reflection (i.e., the operator's finger(s)). The light sensing device 52 then converts this light pattern (comprising both position and intensity) to an electrical signal as shown in FIG. 7. When the virtual data input device is configured as a virtual keyboard, this light pattern may then be used to determine which key was selected by the operator.

To provide accurate input data and to reduce the possibility of input errors, the optical sensor receiving unit 50 may incorporate features to limit the wavelength of light detected by the light sensing device 52. For example, the light sensing device 52 may be designed to detect only the wavelength of light emitted by the light emitting device 42. Thus, the receiving unit 50 may include a light filter 56 to eliminate light of other wavelengths. Alternatively, the light sensing device 52 may be tuned to be wavelength sensitive or selective and designed for the particular wavelength of light emitted by the light emitting device 42.

As those skilled in the art will appreciate, the optical sensor receiving unit 50 requires a source of optical sensor light, which is described above as the light source 40. In an alternative embodiment, the virtual data input device 10 may rely upon ambient light existing in the operator's surroundings as the source of optical sensor light to be reflected off of the operator's fingers and detected by the light sensing device 52. This embodiment, which eliminates the need for the components illustrated in FIG. 4, is preferably used where sufficient ambient light exists, such as an office environment having florescent lighting.

The optical sensor receiving unit 50 transmits the electric signal that it generates to a microprocessor 60, which may be included within the virtual data input device 10. Alternatively, the optical sensor receiving unit 50 may send the electrical signal to a microprocessor 60 of the equipment 70 such that the signals may be interpreted and appropriate data input into the equipment 70. Thus, the microprocessor 60 interprets the signal from the optical sensor receiving unit 50 that is then delivered to and recognized by communications and computing equipment 50. The microprocessor 60 preferably includes an algorithm to determine which of the character data is selected. As an example, the microprocessor 60 may include a stored database of character data signals and then compare the received electrical signals to the signals stored in the database to correlate the received signals to character data. It may be preferred for the operator to first "teach" the system the unique position and/or motion of his/her fingers for a given character. This information may be stored in a database for reference during operation.

The step of reading the operator's finger positions may be accomplished in a variety of ways. For example, the electrical signal generated by the optical sensor receiving unit 50 and transmitted to microprocessor 60 may be substantially continuously read (e.g., every tenth, hundredth, or thousandth of a second) by microprocessor 60 and a character determined after the signal changes. For example, when the operator's fingers are positioned stationary over the "home keys" of "asdf" and "jkl;", the signal from the optical sensor receiving unit 50 remains constant and no character data would be transmitted to the equipment 70. If the operator desires to input the letter "j" the right index finger positioned on that letter would be raised and then repositioned on the "j". After the motion is complete, the microprocessor 60 would detect a change in the signal from the optical sensor receiving unit 50, compare the new signal to the previous signal and a look-up compiled database, and correctly read the newly inputted character. If the new signal does not match any signal stored in the database, no data or character is input during that particular cycle.

Once the operator is aligned with the image, the virtual data input device 10 begins to repetitively attempt to read new character data in a series of detection cycles. Thus, after a preset delay time (e.g., 10 milliseconds), the optical sensor receiving unit 50 receives a pattern of light reflected off of the operator's fingers that represents the position of the operator's fingers within an input zone, i.e., on the image. As described earlier, the reflected light may originate from an optical sensor light source 40 or from ambient light in the operator's surroundings. The reflected light pattern is converted to an electrical signal that is then compared to the electrical signal generated in the last detection cycle. If the electrical signal differs from the signal in the previous cycle, the signal is then used to determine the character (or key) associated with such signal. If the signal corresponds to a recognizable character, the microprocessor 60 accepts such character and inputs it to the equipment 70.

Figure 8:
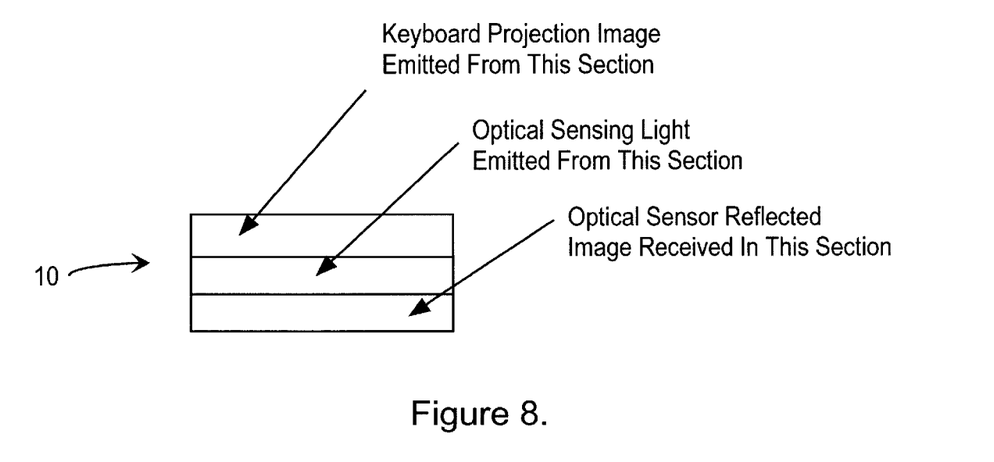
FIG. 8 is a side view of a data input device in accordance with one embodiment of the present invention.

FIG. 8 illustrates a side view of one embodiment of the virtual data input device 10 of the present invention. As depicted in this view, optical images or light emitted from or received by the device 10 include the image projecting the virtual keyboard, the optical sensing light, and the reflected light.

Figure 9:
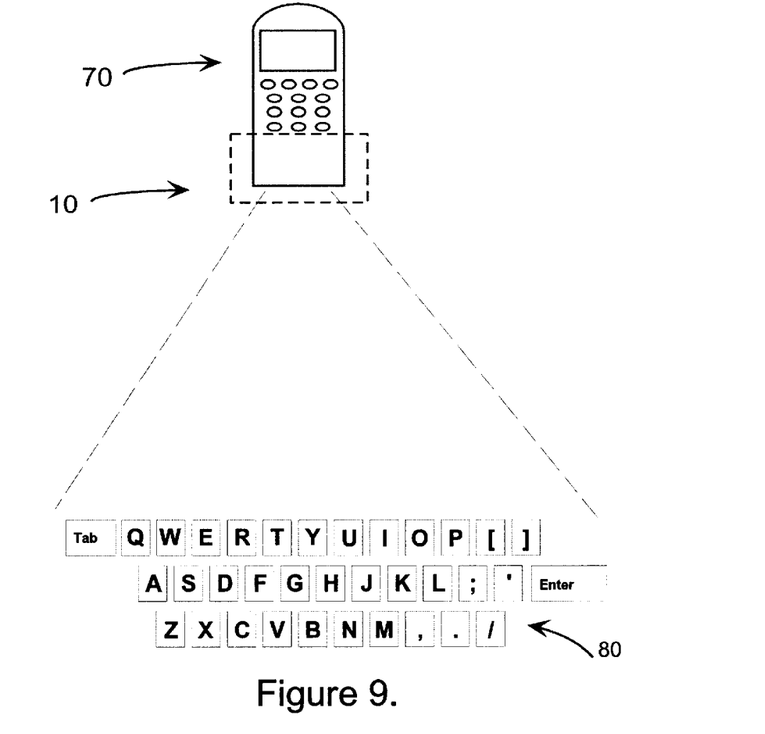
FIG. 9 is an illustration depicting the data input device as a component of a conventional cellular telephone.
Figure 10:
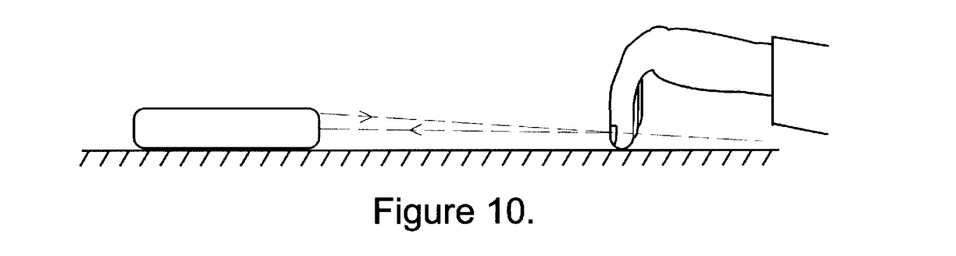
FIGS. 10 and 11 illustrate two side views of the data input device projecting and receiving light rays to and from an operator's fingers.
Figure 11:
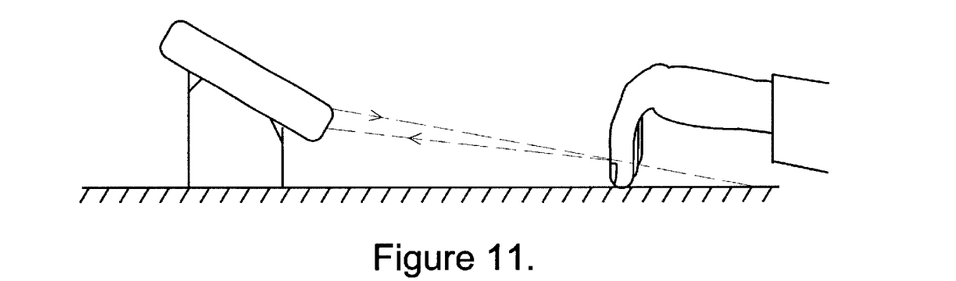

FIG. 9 illustrates the virtual data input device 10 included as a component of a conventional cellular telephone 70, projecting an image of a conventional keyboard 80, which may be used to input alphanumeric data into the cellular telephone for use, for example, when the telephone 70 is used to wirelessly access the Internet. FIGS. 10 and 11 illustrate two side views of the device 10 showing the sensor light being emitted from the sensor light source 40 of the virtual data input device 10 and a portion of the emitted light being reflected off an operator's fingers and back to the sensor light detecting device 50. FIG. 11 shows another embodiment in which the equipment 70 includes collapsible legs or stands to increase the angle between the light rays and the projection surface.

The operation of the virtual data input device 10 may be described with reference to FIG. 12, which representatively illustrates a method of determining an object's position in accordance with the principles of the present invention. In one embodiment, an image is projected in a convenient position for the operator. The operator generally must align his/her fingers with the image to establish a reference position within an input zone formed by the projected image. The plurality of different positions of the operator's fingers within the input zone must be associated with unique character data selections. The method begins at step 91, in which the input device 10 continuously projects an image, e.g., an image of a conventional QWERTY keyboard. In step 92, the operator aligns himself/herself with the projected image to establish a reference position. In step 93, the input device 10 continuously illuminates the input zone with sensor light and, in step 94, the device 10 continuously receives reflected light signals. The method then proceeds into a loop in which the device waits a period of time, e.g., between 10 and 2000 milliseconds (step 95) converts the received reflected light signal to an electrical signal (step 96) and then compares the converted electrical signal to the electrical signal detected and computed on the previous cycle (step 97). If the electrical signal is unchanged, the method returns to step 95 to delay for a short period of time before converting another light pattern. If the electrical signal is changed, the device determines, in step 98, if the converted electrical signal matches a signal in the stored character database. If it does not, the method again proceeds back to step 95 to await the conversion of another received light pattern. If it does, in step 99, the device then determines if the electrical signal matches a "home key" signal in the character database (defined as, e.g., ASDF-JKL;). If the converted electrical signal matches a "home key," the device then determines if the identical electrical signal was taken as an input the previous cycle (step 100) and, if not, the device identifies the difference from the previous signal (step 101) and associates the difference with a particular character (step 102). The method then proceeds with step 103 (after either associating the difference in the signal to a particular character from steps 101 and 102, or determining that the signal matches a character in the database, but not a "home key" signal from steps 98 and 99) to accept the new character data. The new character data is then transmitted into the associated equipment (step 104) and, possibly, displayed on the display screen of the equipment (105). The method then proceeds back to step 95 for the next cycle.

Figure 13:
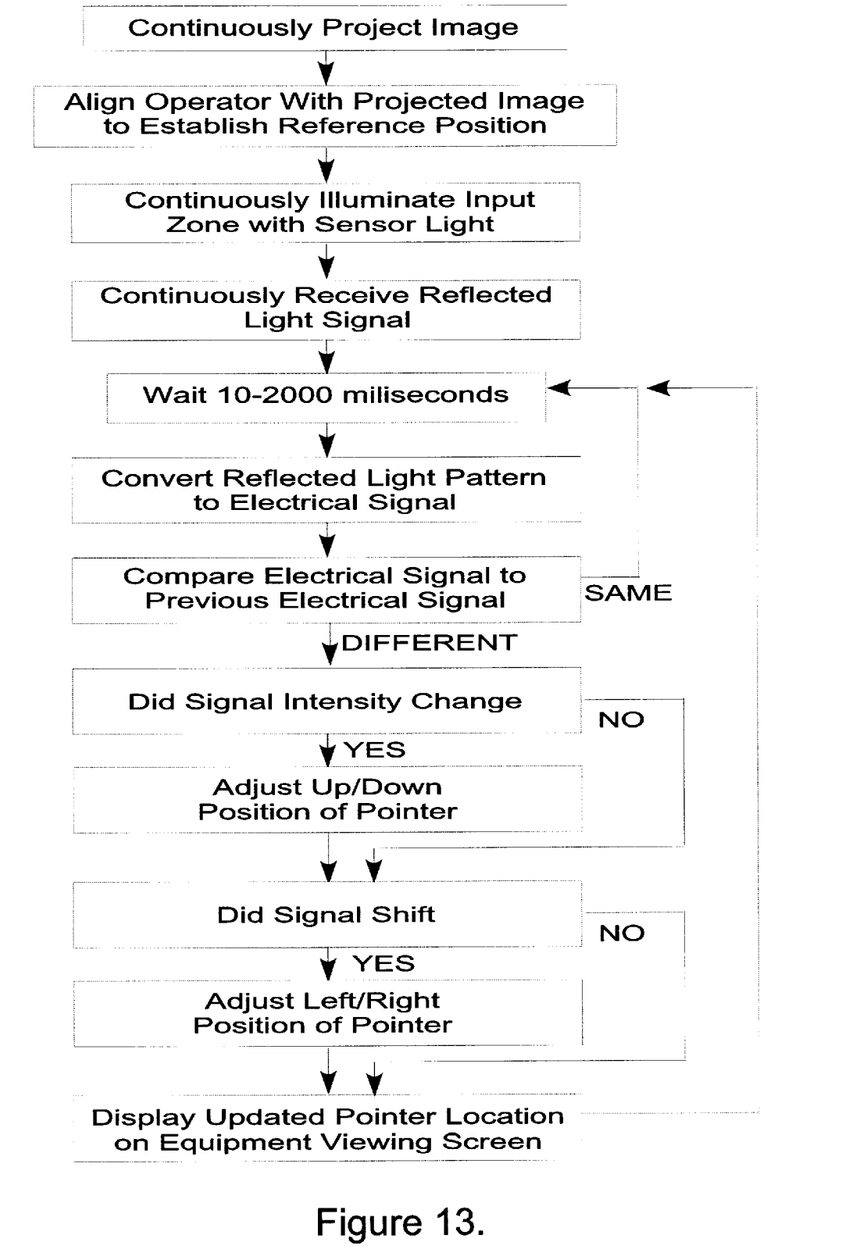
FIG. 13 is a flowchart illustrating the principal steps of a method to input pointing device data in accordance with the present invention.

FIG. 13 illustrates a method using the virtual data input device 10 configured as a pointing device. In this configuration, the input device 10 is typically used to detect the position and motion of one of the operator's fingers moving across an input zone, e.g., a table or desk top.

Figure 12:
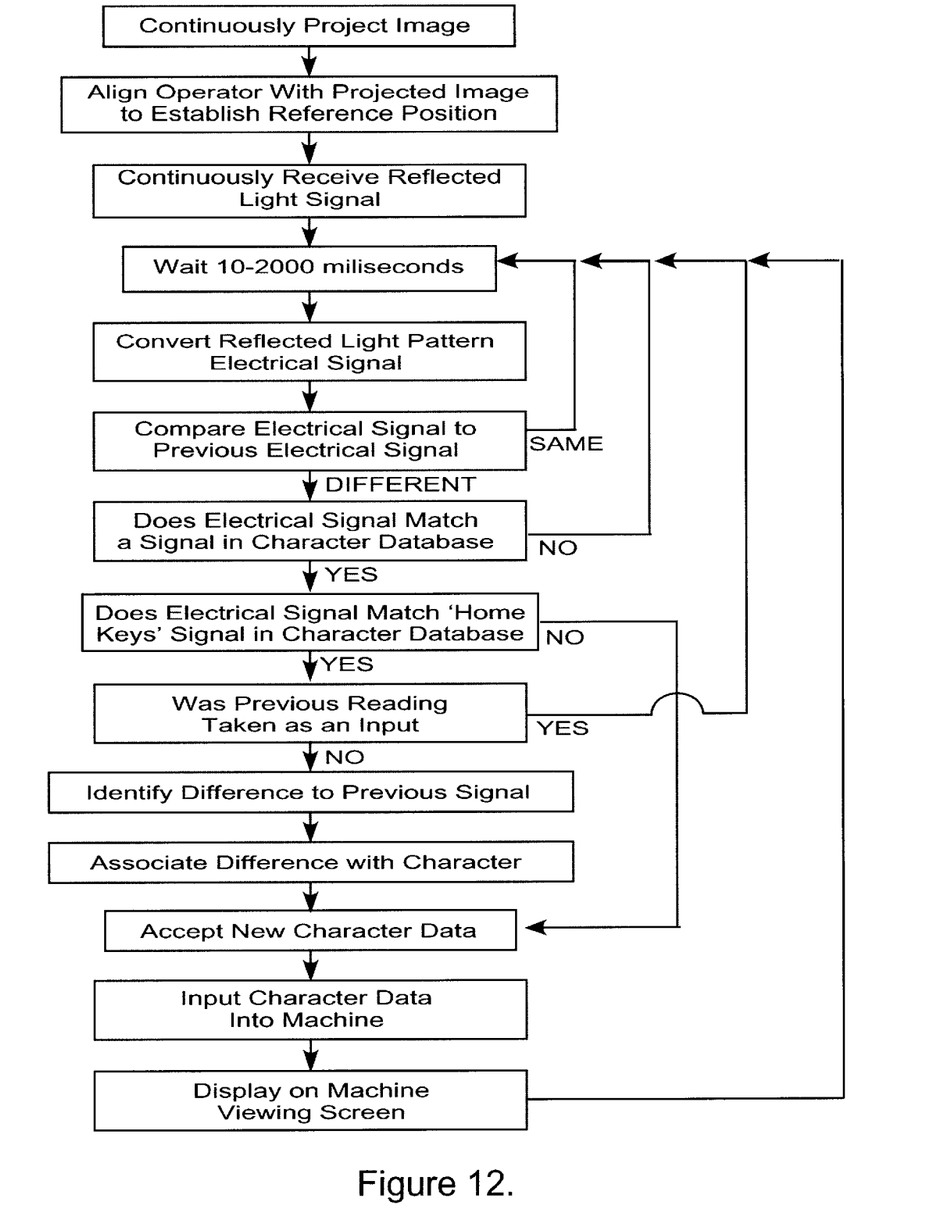
FIG. 12 is a flowchart illustrating the principal steps of a method to input character data in accordance with the present invention.

The method, which is similar in many respects to the method illustrated in FIG. 12, begins with step 111, in which the input device 10 continuously projects an image, e.g., an image of a defined area for data input (e.g., a box, similar to a mouse pad). In step 112, the operator aligns himself/herself with the projected image to establish a reference position. In step 113, the input device 10 continuously illuminates the input zone with sensor light and, in step 114, the device 10 continuously receives reflected light signals. The method then proceeds into a loop in which the device waits a period of time, e.g., between 10 and 2000 milliseconds (step 115) converts the received reflected light signal to an electrical signal (step 116) and then compares the converted electrical signal to the electrical signal detected and computed on the previous cycle (step 117). If the electrical signal is unchanged, the method returns to step 115 to delay for a short period of time before converting another light pattern. If the electrical signal is changed, the device determines, in step 118, if the signal intensity changed and, if so, adjusts the up/down position of the pointing device (step 119). In step 120, the device determines if the signal shifted and, if so, adjusts the left/right position of the pointing device (step 121). The updated pointer location may then be displayed on the display screen associated with the equipment in step 122.

A microprocessor may be used to execute an algorithm to determine which of a plurality of selection options (e.g., keys) is selected. For example, the microprocessor may compare the electrical signal to a stored database of signals representing unique character data selections. Alternatively, the microprocessor may compare the electrical signal to the previous electrical signal to relate the position of a pointing device on a display screen.

As one will understand upon reading the disclosure of the present invention, the use of a projected image is solely for the operator's benefit. Just as many people can readily type on a keyboard without looking down to "hunt and peck" for keys, one may use the virtual data input device without the use of the projected image. It is preferred that there is a mechanism to align the operator's fingers to the virtual data input device 10. Alternatives to the projected image include a simple sheet of paper that is located at a predetermined distance and position from the equipment (e.g., the equipment is rested on a spot marked on the paper). However, since the system is ultimately comparing the relative position of the operator's finger(s), there is an acceptable range of space for the operator to place his/her fingers and, therefore, the alignment of the device 10 is not a necessity.

In another embodiment, the virtual data input device 10 may include the ability to "learn" additional keystrokes. Thus, the operator may assign certain finger positions to a character or set of characters similar to a macro in popular word processing and spreadsheet software programs. Additionally, the system may incorporate a "Hot Key" that allows the operator to switch between modes (e.g., from keyboard to mouse) by simply moving his/her fingers to a predetermined position.

The principles of the present invention may be used as a character input device for various forms of portable communications and computer equipment, including cell phones, Internet-ready cell phones, palm-size computers, personal computers, laptop computers, notebook computers, personal digital assistants, and the like. The invention may also be used to input character data into portable hybrid communications and computing equipment such as palm-size computer telephones, standard desktop computers, hand-held data receiving or entry devices, GPS receivers, inventory management devices, and portable computing equipment integrated with automobiles, aircraft and the like. In addition, the virtual data input device may be used to detect the position of other forms of input means beyond an operator's fingers, such as a writing stylus or a computer mouse. Moreover, the optical sensor light source 40 and the optical sensor receiving unit 50 may be configured to detect the position of an operator's fingers or other objects on a computer display screen. Thus, the features of the present invention can allow the virtual data input device to act as a form of touch sensitive screen.

Although the present invention has been described in considerable detail with reference to certain presently preferred embodiments thereof, other embodiments are possible without departing from the spirit and scope of the present invention. Therefore the appended claims should not be limited to the description of the preferred versions contained herein.

I claim:

1. A data input device optically interfacing with an operator to detect the position of one or more objects within an input zone to allow the operator to enter character data into associated electronic equipment, wherein each position of the objects within the input zone corresponds to a unique selection of data to be entered into the electronic equipment, the input device comprising:

a source of optical sensor light illuminating the input zone with sensor light, the sensor light reflecting off the objects in a direction generally toward the input device;

an optical detector arranged to receive the reflected sensor light as a reflected light pattern representing the position of the objects within the input zone, the optical detector converting the reflected right pattern to an electrical signal;

a light generator positioned to emit visible light and a deflective optical element that projects an optical image of an input device having discrete sub-images at unique positions within the optical image that represent different character data that may be selected for input into the electronic equipment; wherein the deflective optical element comprises a stencil designed to allow light to pass through portions of the stencil and wherein the light generator is positioned to emit visible fight through the portions of the stencil such that the light passed through the stencil forms the optical image; and a microprocessor that receives the electrical signal from the optical detector and correlates the electrical signal to the unique selection of data.

2. The optical data input device of claim 1 wherein the light generator emits visible light having a wavelength sufficiently different than the wavelength of the light emitted by the source of optical sensor light.

3. A data input device optically interfacing with an operator to detect the position of an object within an input zone to allow the operator to control the location of a pointer displayed on a viewing screen of associated electronic equipment, the input device comprising:

a source of optical sensor light illuminating the input zone with sensor light, the sensor light reflecting off the object in a direction generally toward the input device;

an optical detector arranged to receive the reflected sensor light as a reflected light pattern that represents the position of the object within the input zone, the optical detector converting the reflected light pattern to an electrical signal representing the position of the object within the input zone;

a microprocessor that receives the electrical signal from the optical detector and is programmed to correlate the electrical signal to the location of the pointer displayed on said viewing screen; and further comprising an image generator that projects an optical image within the input zone, wherein the optical image has discrete sub-images within the optical image; and wherein the image generator comprises a light generator positioned to emit visible light and a deflective optical element designed to form the optical image; and wherein the deflective optical element comprises a stencil designed to allow light to pass through portions of the stencil and wherein the light generator is positioned to emit visible light through the portions of the stencil such that the light passed through the stencil forms the optical image.

* * * * *